Nov. 12, 1957   H. V. HUBBARD ET AL   2,813,197
LITTER TRAP FOR RAILROAD ROCK SLIDE SIGNAL
Filed March 15, 1954
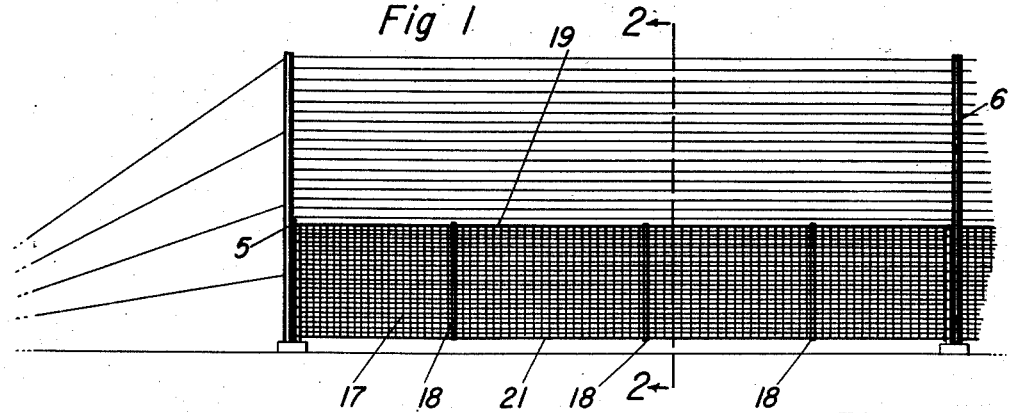
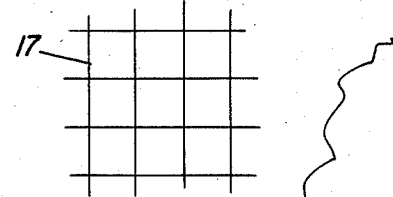
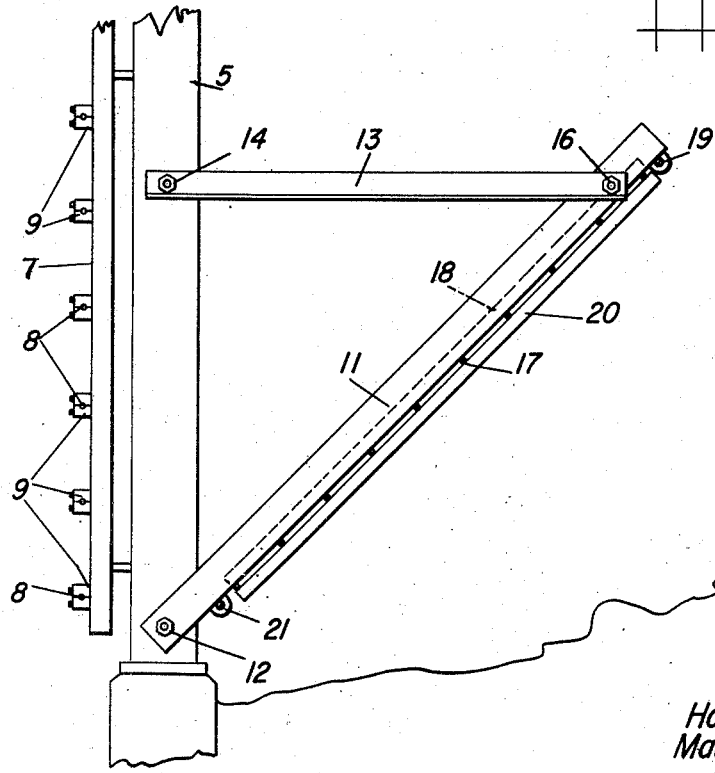
INVENTORS.
Harry V. Hubbard
Maurice J. Couchot
Ray Hawley
BY
ATTY.

United States Patent Office 2,813,197
Patented Nov. 12, 1957

2,813,197
LITTER TRAP FOR RAILROAD ROCK SLIDE SIGNAL

Harry V. Hubbard, Maurice J. Couchot, and Ray Hawley, South San Francisco, Calif.

Application March 15, 1954, Serial No. 416,203

1 Claim. (Cl. 246—121)

This invention relates to litter traps for railroad rock slide signals.

The principal object of this invention is to provide means for trapping debris, such as rocks, bushes and other material which may slide down a bank and tend to build up adjacent a railroad right-of-way, particularly in the vicinity of a railroad rock slide signal.

A further object of this invention is to protect the wires of the railroad signal so that they will not be broken by falling rocks or eventually imbedded in the accumulating material.

A further object is to produce a device which may be attached to ordinary posts supporting the signal wires.

Other objects and advantages will be apparent during the course of the following description.

In the accompanying drawings forming a part of this specification and in which like numbers are employed to designate like parts throughout the same, Fig. 1 is a front elevation of a portion of a rock slide signal having our invention attached thereto;

Fig. 2 is an enlarged fragmentary vertical cross sectional view taken on the line 2—2 of Fig. 1; and Fig. 3 is a fragmentary front elevation of the wire mesh.

Many railroads in crossing an area are required to enter and pass through deep cuts and canyons where slides may occur due to the ground giving way, or because of falling rocks, which might fall upon the tracks and cause a wreck.

It is therefore common practice to protect these areas with signals which comprise a grid formed of parallel wires connected in a closed circuit so that if any one of the wires is broken, a signal will be given at a distant point.

On some banks there is an almost continual sloughing away of the bank material, which comes to rest at a point close to the signal grid. In some instances falling rocks will ricochet and break one of the wires.

Applicants have therefore devised a litter trap which is attached to the ordinary posts in such a manner that the material falling will accumulate behind the trap to a considerable depth. It is then necessary only to loosen the top bar of the trap to swing the trap upwardly and then to pass along back of the grid with a bulldozer or similar apparatus, and to remove the accumulated material, after which the trap is replaced into protective position.

In the accompanying drawings, wherein for the purpose of illustration is shown a preferred embodiment of our invention, the numeral 5 designates one of the end posts supporting the signal grid wire, and the numeral 6 designates an intermediate post, upon which posts are secured space bars 7, which in turn hold the wires 8 of the grid in insulating members 9.

The construction thus far is common to rock slide signals. Our invention consists of a frame 11 pivoted as at 12 to the bottom of the posts and supported at an angle, as best shown in Fig. 2, through the medium of a bar 13 secured to the post 5 as at 14 and to the frame as at 16.

Extending between the frame members and each post is stretched a wire mesh 17 as shown in Fig. 3.

In order to strengthen this mesh to provent sagging throughout its length, we provide spreader bars 18 and 20, which are bolted to the opposite sides of the mesh and to the guy wires 19 and 21, which guy wires run along the top and the bottom of the mesh, the edges of which are secured thereto.

The result of this construction is that when the parts are in the position as shown in Fig. 2, any rocks or other debris falling down the bank, as shown at A will come to rest at the ground level and will eventually pile up and bear against the under side of the mesh 17. When it is desired to clear out this accumulated material, the bolt 14 or 16 may be loosened, the bar 13 moved upwardly parallel with the post 5, and the frame, together with the mesh, pivoted upon its bolt 12 so that it will lie parallel with the signal grid. At this time suitable equipment may be moved behind the signal and the accumulated debris moved away.

It will thus be seen that we have provided a device which will accomplish all of the objects above set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:

A litter trap for railroad signals and including a rock slide signal grid and supporting posts therefor, of a frame pivotally secured to the lower ends of each post, a mesh screen extending between each frame, a bar secured to each of said frame members and to its respective post so as to hold said frame members and said mesh screen at an angle extending outwardly and upwardly from the base of said posts to form a confining area therebeneath.

References Cited in the file of this patent
UNITED STATES PATENTS

| | | |
|---|---|---|
| 731,320 | Newell | June 16, 1903 |
| 838,153 | Willoughby | Dec. 11, 1906 |
| 1,144,393 | Swezey | June 29, 1915 |
| 1,184,046 | Swezey | May 23, 1916 |

OTHER REFERENCES

"Southern Pacific Uses Special Protection" in Railway Signaling, March 1939, pages 155–159.